April 26, 1955

C. W. SUNDBERG 2,707,131

WHEEL ORNAMENT HOLDING STRUCTURE

Filed Jan. 7, 1953

INVENTOR.
CARL W. SUNDBERG
BY
ATTORNEY.

United States Patent Office 2,707,131
Patented Apr. 26, 1955

2,707,131

WHEEL ORNAMENT HOLDING STRUCTURE

Carl W. Sundberg, Birmingham, Mich., assignor to Sundberg & Ferar, Royal Oak, Mich., a copartnership Application January 7, 1953, Serial No. 329,981

11 Claims. (Cl. 301—124)

This invention relates to a wheel ornament holding structure, and more particularly to a structure in which the elements cooperate with a non-rotating wheel axle spindle to provide an outboard wheel ornament supporting construction.

Wheel ornaments for automobiles are usually applied directly to the hub caps or the flanges of the wheels. It is deemed highly desirable to apply a non-rotating ornament to a wheel for decorative purposes, and the instant invention provides a device which performs that function with ease and simplicity.

Motor driven vehicles of the automobile type are generally constructed with a non-rotating front axle having spindle ends arranged to directly support wheel bearings on which the wheels rotate. The wheel bearings are usually in the tapered roller group and are mounted in the wheel hubs in such a manner as to retain the wheel between the frustums of the conical shaped bearings. Bearing against the outer face of the outer wheel bearing is a washer and a castellated nut, the latter being retained in position by a cotter pin passed through the nut serrations and a hole in the axle spindle.

There is a critical range within which the castellated nut properly fits against the bearing washer, inasmuch as the wheel bearings rotate with the wheel. If the nut is drawn up too tightly, undue loading is placed on the wheel bearings and they do not function properly. If the nut is not drawn up closely enough against the bearing washer, the bearings will shift axially on the spindle and rapid failure of bearings, cotter pin and nut will result with loss of the wheel, the axle spindle or both. Therefore, the adjustment of the castellated nut on the axle spindle is of prime concern, and such adjustment should be performed only by well-qualified persons. The average automobile operator does not fall into that category, unless he has been carefully instructed in the manner of and the reasons for so adjusting the nut on the axle spindle.

It is therefore very desirable to avoid any front wheel ornament holding construction which will involve the removal and/or readjustment of the castellated nut. For to do so, particularly in the hands of the inexperienced and uninstructed, may result in loss of the wheel and possible damage to the vehicle and its passengers. Such danger is excluded by the construction here described and claimed. In addition, the simplicity of the device is such that any person may be able to mount it upon the front wheel axle spindle with ease and in a positive fashion. The elements of the inventive structure cannot be related except in the manner described, eliminating the possibility of misapplying the structure to the axle spindle.

The wheel ornament should be placed outside the rotating front wheel and its hub cap, and this is accomplished by affixing the inventive holding structure to the non-rotating axle spindle. In this way, the wheel ornament becomes non-rotating and always remains in a fixed position.

It is an object of this invention to provide a wheel ornament holding structure that can be affixed to a non-rotating wheel axle spindle. Another object is the provision of such a device which is affixed without disturbing or rearranging any wheel holding mechanism or elements mounted upon the axle spindle. A further object is to provide a device that will support a wheel ornament outwardly of the wheel. Still another object is the provision of a non-rotating wheel ornament outwardly of a rotating wheel and its hub cap. A further object is the provision of a wheel ornament holding structure that is assembled in a particular manner, and cannot be misassembled except through sheer negligence or intentional misapplication. Other objects will become apparent from the following specification, the drawings related thereto and from the claims hereinafter set forth.

The description together with the appended drawing is a disclosure of one form which the invention may take, and is not intended to be a limitation of the forms or variations which persons skilled in the art may make. The terms are used for purposes of description and not of limitation.

Referring now to the drawing annexed hereto and forming an integral part of this specification, Fig. 1 is a front elevation of a portion of an automobile showing a front wheel embodying the invention.

Figure 1:
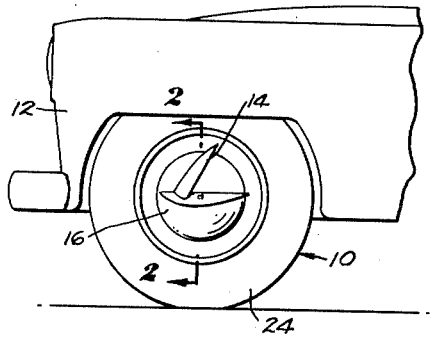
Figure 2:
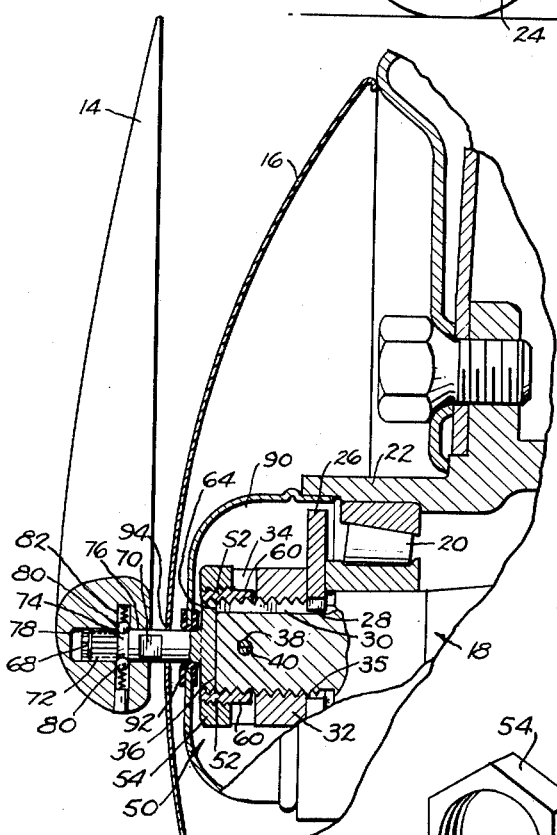
Fig. 2 is an enlarged vertical sectional view on the line 2—2 of Fig. 1.
Figure 3:
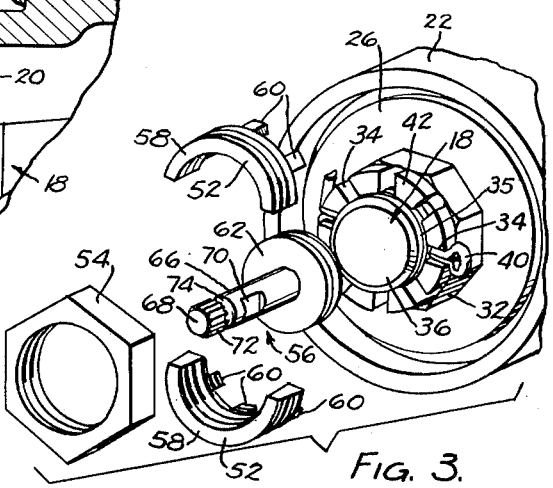
Fig. 3 is an exploded horizontal view, substantially on the scale of Fig. 2, of the inventive wheel ornament holding structure as applied to a non-rotating front wheel axle spindle, showing the relationship of the structural elements.

As shown in Figs. 1 and 2, a front wheel 10 is mounted on an automobile 12 (shown fragmentarily). A wheel ornament 14 is positioned outwardly of the wheel 10 and its hub cap 16. The usual construction for mounting a wheel 10 for rotation about a non-rotating axle spindle 18 is to provide inner and outer bearings 20, the outer bearing only being shown in the drawings, which rotate on axle spindle 18. The wheel hub 22 is designed to contain the bearings 20 and in turn to rotate upon them. On the outer periphery of wheel 10 is mounted a suitable tire 24 in accordance with standard accepted practice.

Adjacent the outer bearing 20 is placed a non-rotating washer 26. Often this washer is provided with an internal center-pointed lug 28 which passes along a longitudinally disposed lug groove 30 in the axle spindle 18. The combination of washer lug 28 in axle spindle groove 30 prevents rotation of the washer 26. A castellated nut 32, provided with internal threads and serrations 34 is screwed onto the threaded end portion 35 of the axle spindle 18 and up against the non-rotating washer 26. Intermediate the outer tip end face 36 of the axle spindle 18 and the operating position of washer 26 is a cotter pin hole 38 arranged transversely through the longitudinal axis of the axle spindle 18. When nut 32 is threaded into adjusted position against washer 26, a cotter pin 40 is passed through nut serrations 34 and axle spindle hole 38 holding the nut 32 in fixed position upon the axle spindle 18.

Figure 4:
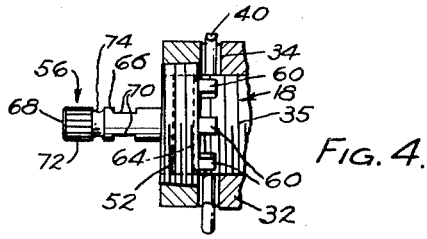
Fig. 4 is a view similar to that in Fig. 2, showing the inventive construction applied to an axle spindle where the castellated nut rests substantially flush with the end of the axle spindle.

This construction is substantially standard for most automobiles as they are presently assembled. Very often there are a few threads on the axle spindle 18 projecting outwardly beyond the serrated face 42 of nut 32, as shown in Fig. 2. But again, there may be no such threads, as shown in Fig. 4. The inventive structure here described and claimed will function effectively in either case.

The wheel ornament holding structure 50 consists of split bushing segments 52, 52, a wrapping nut 54, and a wheel ornament supporting pin 56.

The split bushing segments or halves 52, 52 are provided with threads on the internal diameter identical with the thread size of the axle spindle end 35. On the outside, the split bushing segments are tapered, with the smaller diameter at the full ends 58, 58 and the larger diameter at the ends containing fingers 60. This taper is moderate. The threads on the outsides of the split bushing segments 52, 52 may be the same or different than those on the axle spindle end 35 and the inside of the split bushing segments.

Fingers 60 project from one of the ends of the split bushing segments 52, 52, and are arranged to slip within the serrations 34 of castellated nut 32. However, each split bushing segment or half 52 has a lesser number of fingers than one-half the total number of serrations 34. For instance, if there are 8 serrations 34 in nut 32, each split bushing half 52 will have no more than 3 fingers 60 thereon. This is so in order to provide serration spaces for the cotter pin 40 to pass through, which the fingers 60 should not fill. If there are 6 serrations 34 in nut 32, then each split bushing half 52 would have a maximum of 2 fingers 60, for the same reason. Where a cotter pin 40 does not pass through serrations 34 of nut 32, then fingers 60 may fill all serrations 34 to grip the axle spindle threaded end portion 35.

It is easily apparent, of course, that instead of having two split bushing segments 52, there may be three or four of them, or a greater number, if desired or required under the peculiar conditions of the application.

Complementing the tapered threaded split bushing halves 52, 52 is the wrapping nut 54, which is provided with an internal tapered thread to match that on the outside of the split bushing segments 52. Wrapping nut 54 is threaded onto the split bushing halves 52, 52 holding them together.

The wheel ornament supporting pin 56 is provided with an externally threaded flange 62, having an end face 64, and a stud section 66 central of the flange 62 and projecting therefrom. The pin 56 is made as an integral part. Intermediate the flange 62 and the outer end 68 of the stud section 66 are parallel flats 70 for use in applying a wrench to the stud section when the pin 56 is assembled in structure 50. At the outer end 68 are a number of splines 72, longitudinally arranged about the periphery of the stud section 66, and adjacent the splines and behind them is a semi-circular groove 74 transversely of the pin axis. The threads on the outside diameter of the flange 62 are complementary with the threads on the inside diameter of the split bushing segments 52, 52 into which they go.

It is not absolutely necessary that the threads on the internal diameter of split bushing segments 52, 52 be constant throughout their length. For instance, the threads on the fingers 60 should be the same as the threads on the axle spindle end 35. This same thread size may extend for one or two or three threads into the split bushing segments 52, 52. At that point, a finer thread could be used for the remainder of the parts to complement a finer thread on the pin flange 62. However in such case, the coarse threads should not continue beyond the point at which the tip end face 36 of the axle spindle threaded end portion 35 would be positioned. The significance of this feature will become more apparent from a description of the assembly operation which is given below.

It will be recognized, of course, that fine threads give greater holding power than coarse threads, and this advantage may be desirable and can be utilized as described.

The wheel ornament anchoring end 68 of pin 56 may be arranged in a number of ways. It is desirable to make installation and disassembly of wheel ornament 14 on the holding structure 50 as simple as possible. The splined end 68 with ball groove 74 is one way of accomplishing this purpose, but it is not the only way. Set screws, bolts and other fastening means may be employed in such manners as are well known in the art, to fasten the wheel ornament 14 to the pin stud section 66. To accommodate and match this pin end construction, wheel ornament 14 is provided with a recess 76 having a spline portion 78, and spring actuated balls 80 in pockets 82 arranged transversely the axis of the recess 76.

To assemble the wheel ornament 14 onto the wheel 10, a preferred method is the following. The split bushing segments 52, 52 of holding structure 50 are arranged so that the fingers 60 are placed within the serrations 34 and about the face 42 of nut 32, which is mounted on axle spindle threaded end 35 and held in position by cotter pin 40. The split bushing halves 52, 52 will require a slight tilting in order to pass the internally threaded fingers 60 into the nut serrations 34 and place them upon the open available portions of the threads of the axle spindle end 35 which lie within and/or beyond the nut serrations 34. The angularity of the serrations 34 will not permit a direct passing of the fingers 60 into them and then down upon the spindle threads, and therefore the split bushing segments 52, 52 will have to be tilted into place.

A careful study of the nut 32, its serrations 34 and the threads on the axle spindle end 35 will enable any person skilled in the art to so arrange the width and depth of the fingers 60 as to obtain the maximum and/or desirable number of thread contacts between the fingers 60 and the threads on the axle spindle end 35. This is a manufacturing aspect which is readily solved. The actual installation of the split bushing segments 52, 52 is very simple and can be performed by practically anyone. The internal threads of the split bushing segments at the fingers 60 go over the threads of the axle spindle end 35 and into direct contact with them by overlaying them. When assembled upon the axle spindle end 35, the split bushing halves 52, 52 will arrange themselves with the serrations 34 of nut 32 to form a complete holding bushing.

When the split bushing halves 52, 52 are anchored upon the threads of the axle spindle end 35 and matched together, wrapping nut 54 is threaded onto the outside of the split bushing halves 52, 52 locking them together. Since it is preferred, though not absolutely necessary, to put a slight taper on the internal threads of the nut 54, and the outside of the split bushing halves 52, 52, it is recommended that the flange 62 of supporting pin 56 be threaded into the internal threads of the split bushing halves 52, 52 before the wrapping nut 54 is locked up tight on the split bushing halves. The flange face 64 of pin 56 should be threaded directly up to and firmly against the axle spindle tip end face 36. If desired, some sort of a lock washer or other turn-resistant device may be placed between the flange 64 and the axle spindle end 36. Such a washer or device is not shown; and though not essential, under certain exceptional circumstances, it may be desirable.

After the pin 56 is threaded into the split bushing segments 52, 52 as described, wrapping nut 54 is threaded tightly upon the segments 52, 52 up to and against the serrated face 42 of the castellated nut 32. The taper on the wrapping nut threads and the split bushing external threads will tend to bind the pin flange 62 in place. At the same time the nut against nut contact on the split bushing segments 52, 52 will hold them firmly upon the threads of the axle spindle end 35 and tend to prevent their bearing on or applying a load directly to the castellated nut 32 or to the cotter pin 40. This is aided by locking the supporting pin 56 tightly inside split bushing segments 52, 52 and against the axle spindle end 36.

Since it is desirable to seal the grease or lubricant used in the wheel bearings therewithin, a grease or dust cap 90 is provided to fit within the outer end of the wheel hub 22. The dust cap 90 is arranged with an axial opening surrounded by a grommet 92 of suitable material, such as oil-resistant rubber or felt. The dust cap grommet 92 is designed to rotate with the wheel hub 22 around the circumference of the pin stud section 66, and seal the enclosed structure from external dirt and dust. Hub cap 16 is also provided with an axial opening 94, permitting the pin stud section 66 to pass therethrough. A grommet (not shown) may be affixed around hub cap opening 94, if desired or required.

After the dust cap 90 is arranged in place on the wheel hub 22, and the hub cap 16 anchored in the wheel, wheel ornament 14 is affixed to the holding structure 50 by passing the ornament recess 76 over and around the supporting pin end splines 72, until the ornament internal splined portion 78 is meshed with the supporting pin end splines 72, and the retaining spring actuated balls 80 pass into the ball groove 74, fixing the ornament 14 in a positive position on the holding structure 50.

In manufacturing the wheel ornament holding structure 50, the split bushing segments 52, 52, the wrapping nut 54 and the supporting pin 56 could probably be made most economically on automatic screw machines from steel. The wheel ornament 14 may be made of metal as a casting, or of plastic, or made as a combination of these two materials. However these are not the only materials from which the wheel ornament 14 can be made.

Further, it is possible to make each split bushing segment 52 into a number of smaller segments, each having a single finger 60, and arranged to complement each other about the supporting pin 56. Such single finger segments would be threaded internally and externally as described for the split bushing halves 52.

Having described my invention in its simplest terms, it is to be understood that the details of the foregoing specification may be changed and varied in greater or lesser degree without departing from the essence of my invention.

I claim:

1. A wheel ornament holding structure for a non-rotating axle spindle having a castellated nut threaded thereon and held in a fixed position by a cotter pin comprising internally and externally threaded split bushing halves having projecting fingers at one end thereof adapted to impinge upon and engage with the threads of said threaded axle spindle between the castellations of said castellated nut, a wheel ornament supporting pin having an externally threaded flange at one end thereof threadedly mounted in said split bushing halves, and a wrapping nut threadedly mounted on said split bushing halves.

2. A wheel ornament holding structure for a non-rotating threaded end axle spindle having a castellated nut with its serrations facing outwardly screwed thereon and held in position by a cotter pin consisting of internally and externally threaded split bushing segments having projecting fingers at one end thereof adapted to match with and engage said threaded end axle spindle, said fingers impinging directly on said threaded end axle spindle and within the serrations of said castellated nut, a wheel ornament supporting pin having an externally threaded flange at one end thereof adapted to thread into said split bushing segments, and a wrapping nut adapted to thread upon said split bushing segments.

3. A wheel ornament holding construction consisting of a non-rotating axle spindle having a threaded end portion, a castellated nut with its serrations facing outwardly screwed on said axle spindle and held in position against rotation by a cotter pin passed through said nut and said axle spindle, a pair of internally and externally threaded split bushing segments arranged in cylindrical form, each of said split bushing segments having projecting fingers at one end thereof adapted to engage with the threads of said axle spindle threaded end portion, said fingers impinging directly on said axle spindle threaded end portion and within the serrations of said castellated nut, a wheel ornament supporting pin threadedly mounted in said split bushing segments against said axle spindle, and a wrapping nut threadedly mounted on and over said split bushing segments and bearing against said castellated nut.

4. The construction of claim 3, and including a turn-resistant means within said split bushing segments and between said wheel ornament supporting pin and said axle spindle.

5. A wheel ornament holding construction consisting of a non-rotating axle spindle having a threaded end portion, a castellated nut having a serrated face and its serrations facing outwardly screwed onto said threaded end portion and held in position against rotation on said axle spindle, a number of internally and externally threaded split bushing segments arranged in cylindrical form about said threaded end portion, each of said split bushing segments having a projecting finger or fingers at one end thereof adapted to engage with the threads of said axle spindle threaded end portion, said fingers impinging directly on said threaded end portion and within the serrations of said castellated nut, a wheel ornament supporting pin threadedly mounted in said split bushing segments against said axle spindle, a wrapping nut threadedly mounted on and over said split bushing segments and against the serrated face of said castellated nut, and a wheel ornament removably fixed on said supporting pin by fastening means.

6. A device of the character described for coupling with a non-rotating axle spindle having a threaded end portion on which is mounted, in non-rotating position, a castellated nut having a serrated face and its serrations facing outwardly screwed onto said threaded end portion, consisting of internally and externally threaded split bushing segments arranged in cylindrical form about said threaded end portion, each of said segments having projecting fingers at one end thereof adapted to engage with the threads of said axle spindle threaded end portion, said fingers impinging directly upon said threaded end portion and within the serrations of said castellated nut, a wheel ornament supporting pin threadedly mounted in said split bushing segments against said axle spindle, and a wrapping nut threadedly mounted on said split bushing segments and against the serrated face of said castellated nut.

7. The device of claim 6, and including an ornament removably fixed on said supporting pin by fastening means.

8. An object holding device applicable to a threaded end non-rotating spindle having a serrated face castellated nut mounted non-rotatably thereon with its serrations facing outwardly of said spindle, consisting of internally and externally threaded split bushing segments having internally threaded fingers at one end thereof adapted to match said threaded end spindle and threadedly engage therewith within the serrations of said castellated nut, an object supporting pin threadedly mounted in said split bushing segments, and a wrapping nut threadedly mounted on and over said split bushing segments.

9. The device of claim 8, wherein said object supporting pin has an end portion projecting outwardly of said split bushing segments, and an object affixed to said supporting pin end portion by fastening means.

10. An object holding device applicable to a threaded end non-rotating spindle having a serrated face castellated nut mounted non-rotatably thereon with its serrations facing outwardly of said spindle, consisting of split bushing segments, externally taperingly threaded and internally threaded, having internally threaded fingers at one end thereof adapted to match said threaded end spindle and threadedly engage therewith within the serrations of said castellated nut, an object supporting pin threadedly mounted in said split bushing segments, and a wrapping nut on and over and taperingly threaded to match and engage with said split bushing segments, whereby said object supporting pin is subjected to increasing binding pressure from said split bushing segments when said wrapping nut is threadedly advanced on said segments.

11. The device of claim 10, wherein said object supporting pin has an end portion projecting outwardly of said split bushing segments, and an object affixed to said supporting pin end portion by fastening means.

References Cited in the file of this patent

UNITED STATES PATENTS

| | | |
|---|---|---|
| 331,805 | McCalop | Dec. 8, 1885 |
| 1,644,339 | Kalatzky | Oct. 4, 1927 |
| 2,548,070 | Ryan | Apr. 10, 1951 |